Patented July 14, 1953

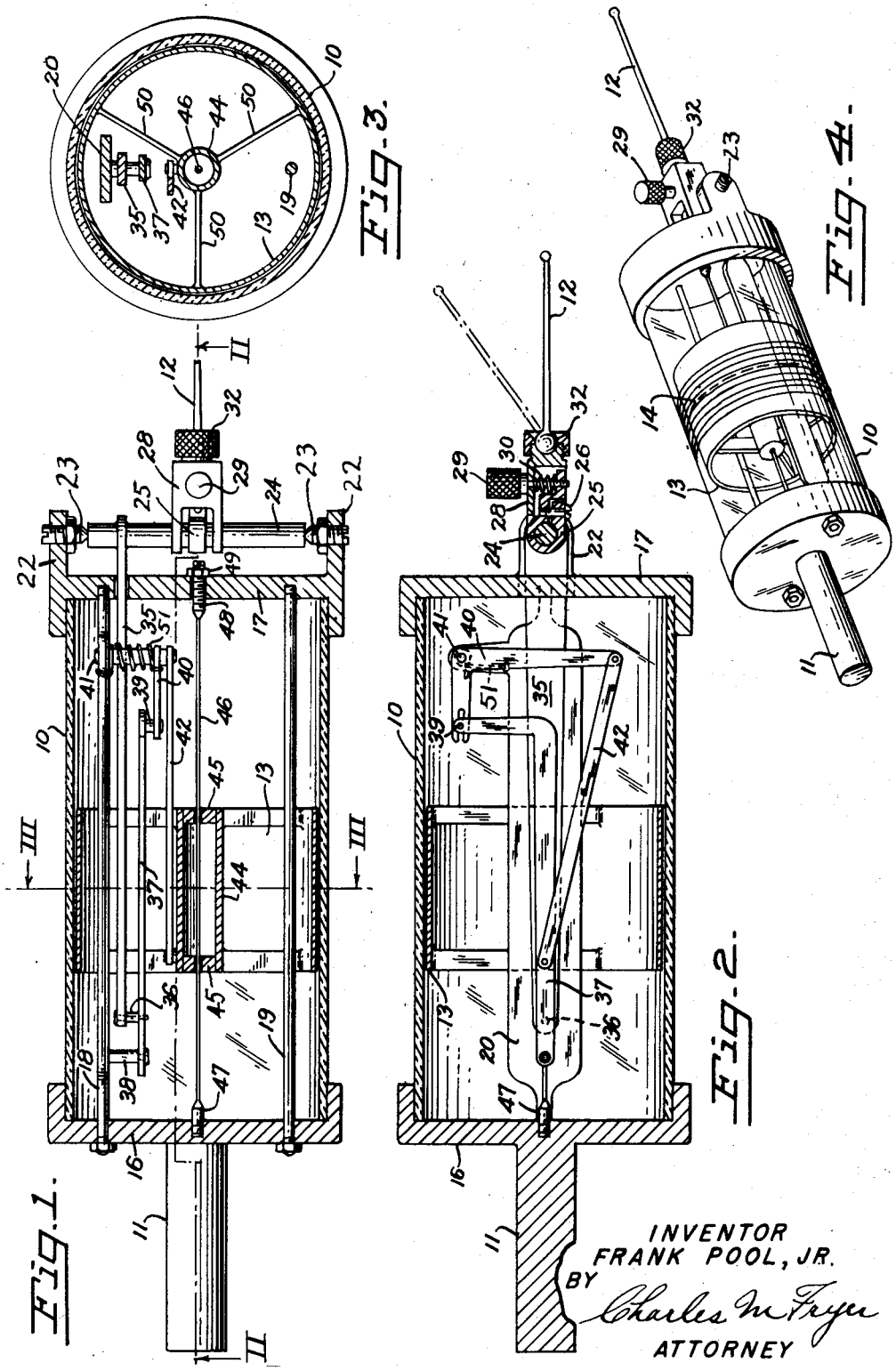

2,645,024

UNITED STATES PATENT OFFICE 2,645,024

AXIAL INDICATOR

Frank Pool, Jr., Palo Alto, Calif.

Application February 12, 1951, Serial No. 210,495

2 Claims. (Cl. 33—172)

1

This invention relates to machine indicators and particularly to an indicator that has a cylindrical dial with reference marks circumscribing it to make it possible to take a reading with the indicator disposed at any angle or during rotation. The indicator of the present invention finds many applications in use but is particularly adapted for use in rotation as where it will be mounted in the head stock of a lathe or in the chuck of a drill press or boring machine. In either case, it has a feeler or finger that may be adjusted to an angle with respect to its axis of rotation for contact with the wall of a cylinder or with a flat surface disposed normal to said axis. Angular movement of the finger caused by dimensional variations in a surface over which it passes are transmitted to a cylindrical part and cause axial movement of that part whereby its displacement can be viewed with reference to a suitable scale as it rotates.

It is the object of this invention to provide an indicator that is operable during its rotation to pass a sensing finger over a flat or cylindrical surface and to indicate dimensional variations in the surface on a dial that is substantially cylindrical and concentric with its own axis of rotation. Further and more specific objects and advantages of the invention are made apparent in the following specification where the invention is described in detail by reference to the accompanying drawing.

In the drawing:

Fig. 1 is a central longitudinal section of an indicator embodying the present invention;

Fig. 2 is a sectional view taken on the line II—II of Fig. 1;

Fig. 3 is a transverse section of the indicator taken on the line III—III of Fig. 1, and Fig. 4 is a perspective view of the same indicator.

In general, the indicator of the present invention comprises a cylindrical casing with its cylindrical wall shown at 10 formed of glass or other transparent material. A shaft 11 projects from one end of the casing in axial alignment therewith to support it for rotation as in the chuck of a lathe or boring machine. A sensing finger 12 is disposed at the opposite end of the cylinder on an adjustable mounting so that it may be arranged to contact either the inner or outer wall of a cylinder mounted co-axially with the cylindrical housing 10. The sensing finger 12 may also be brought into contact with a flat surface normal to the axis of the cylindrical housing 10 as would be the case where the indicator would be mounted in the chuck of a drill press or boring machine and a piece of flat work was disposed on the work table of the machine. An indicating dial or card shown at 13 is mounted for sliding movement within the cylinder 10 and any movement of the sensing finger 12 caused by variations in the regularity of the surface over which it passes is transmitted through suitable multiplying linkage presently to be described to the indicating dial in a manner to cause it to move axially within the transparent cylinder. The cylinder 10 has suitably spaced reference lines formed on its outer cylindrical surface as best illustrated in Fig. 4 of the drawings and a reference line 14 is carried on the dial. This line may be marked on the cylinder and the spaced lines on the dial if desired and it is preferred that the single line be a dotted line to make it readily distinguishable from the other lines. The central one of the spaced reference lines on the dial may be considered as representing a zero position and may be heavier or colored to distinguish it from the other lines which are spaced to indicate any desired dimensions, such for example as ten thousandths of an inch.

In the specific construction herein illustrated, the transparent cylinder 10 is provided with a pair of ends 16 and 17 held in place thereon as by tension bolts 18 and 19. The bolt 18 is provided with an enlarged flat portion 20 intermediate its ends as shown in Figs. 2 and 3 which serves as a mounting for the multiplying linkage interposed between the sensing finger and the valve. The end 16 of the cylinder supports the shaft 11 and the end 17 has a pair of diametrically spaced lugs 22 carrying adjustable bearings 23 between which a shaft 24 is mounted for oscillating movement. The sensing finger 12 is guided by the shaft 24 by adjustable means shown in Figs. 1 and 2. This adjustable means comprises a part 25 securely affixed to the shaft as by a clamping screw 26. An adjustable part 28 is mounted on the shaft 24 for oscillation relative to and is connected to the part 25 by a thumb screw 29 and a spring 30. Since the sensing finger is mounted on a hub 28, the tendency of the spring 30 to expand and move the sensing finger in one direction is limited by the adjusting screw which may be turned to move the finger in the opposite direction. The angle of the sensing finger is also adjustable as for example to the position indicated in dotted lines in Fig. 2 through a ball and socket connection including the threaded friction nut 32 designed to hold it in any position of adjustment. This mounting also permits removal of the finger so that it may be replaced by one having a point capable of probing a center punch mark or by one that is curved where the shape of the work makes this desirable.

In setting up the indicator, it is contemplated that the sensing finger 12 will first be brought into contact with the surface of the work by adjusting the ball and socket joint and since the thumb screw 29 adjusts the relative position of the sensing finger and the dial 13, it may be employed to bring the dial to a zero position while the sensing finger is in contact with the work. As the indicator is rotated and the sensing finger passes over the surface of the work, irregularities in the surface, such as might result from the work being off center with respect to the machine or out of round, will be transmitted to the shaft 24 and will effect oscillation of the shaft. This oscillating movement of the shaft 24 is transmitted to the dial through more or less conventional multiplying linkage including the following parts shown in the drawings. A lever 35 is fixed to the shaft 24 and projects through a suitable opening in the end 17 of the casing. Swinging movement of this lever resulting from rocking of the shaft 24 is transmitted through a pin 36 on its end to an L-shaped lever 37 pivotally mounted on a post 38 supported by the part 20 within the casing. The opposite end of the lever 37 has a pin and slot connection 39 with a bellcrank lever 40 pivotally supported on a post 41 also carried by the part 20. A link 42 extends between the bellcrank 40 and a hub-like part of the dial 13 to complete the connection between the sensing finger and the dial.

The dial 13 is preferably of light weight construction and to enable its free sliding movement within the cylindrical casing it has a hub 44 with sliding bearings 45 in its ends mounted on a guide wire 46. The wire 46 is anchored at one end by a screw 47 and at the opposite end by a screw 48 so that it may be tensioned by adjustment of a nut 49. Radially arranged spokes 50 shown in Fig. 3 as 3 in number emanate from the hub and support the cylindrical part of the dial 13 which is preferably just slightly smaller than the interior of the transparent cylinder 10. A spring 51 encircles the post 41 and acts between the bellcrank 40 and a part of the member 20 to bias the linkage and the finger 12 in one direction in order to hold the finger against the surface of the work.

The indicator herein described has the advantage that it is readable in any axial position or even during rotation so that upon being supported in the rotary chuck of a machine by means of its shaft 11, the sensing finger may be moved over a circular surface or path and variations in its position caused by irregularities in the surface will be accurately indicated in an easily readable position by movement of the cylindrical dial with respect to the circular reference line 14.

I claim:

1. An indicator of the character described comprising a hollow transparent cylindrical body member, a shaft projecting axially from one end of the body member by means of which it may be supported for rotation, an angularly movable sensing finger projecting from the opposite end of the body member to contact a work surface during such rotation, a guide wire disposed axially of the body member, means slidable axially within the body member on said wire, reference lines on said means and on the body member, and motion transmitting means connecting the finger and said slidable means to visibly indicate the magnitude of angular movement of the finger while the body member rotates.

2. A machine indicator comprising a transparent cylindrical body member, a cylindrical dial disposed within the body member, a guide disposed axially of the body member, axial bearings on the dial slidable on the guide to support the dial for sliding movement free of contact with the body member, an angularly movable sensing finger projecting from one end of the body member for contact with a work surface, means connecting the sensing finger with the dial to impart axial movement to the dial upon angular movement of the sensing finger, said connecting means comprising multiplying linkage disposed within the body member and reference lines on the dial and body member to indicate visibly the movement of the dial.

FRANK POOL, Jr.

References Cited in the file of this patent

UNITED STATES PATENTS

| Number | Name | Date |
|---|---|---|
| 715,582 | Jacobs et al. | Dec. 9, 1902 |
| 869,483 | Dennis et al. | Oct. 29, 1907 |
| 1,269,728 | Miller | June 18, 1918 |
| 1,524,980 | Krebs | Feb. 3, 1925 |
| 1,860,993 | Clarkson | May 31, 1931 |